United States Patent [19]

Grosch et al.

[11] 3,942,370

[45] Mar. 9, 1976

[54] METHOD FOR DETERMINING THE PREFERRED DIRECTION OF ROTATION OF A TIRE

[75] Inventors: Karl Alfred Grosch, Rott; Gerhard Franz-Josef Senger, Aachen; Georg Freudenstein, Aachen-Brand, all of Germany

[73] Assignee: Uniroyal A.G., Aachen, Germany

[22] Filed: Oct. 25, 1974

[21] Appl. No.: 518,025

[30] Foreign Application Priority Data

Nov. 6, 1973  Germany............................ 2355387

[52] U.S. Cl. ................................................. 73/146
[51] Int. Cl.². ........................................ G01M 17/02
[58] Field of Search........... 73/146; 152/361 R, 330, 152/354, 357, 374; 33/203.13

[56] References Cited
UNITED STATES PATENTS

| | | | |
|---|---|---|---|
| 3,142,178 | 7/1964 | Gough et al. .......................... | 73/146 |
| 3,630,077 | 12/1971 | Boileau................................... | 73/146 |

*Primary Examiner*—Donald O. Woodiel
*Attorney, Agent, or Firm*—Herbert A. Stern

[57]  ABSTRACT

A method for determining the preferred direction of rotation of a vehicle tire including determining the direction of rotation of the tire in which the lateral structural force acting on the tire is greater. After this determination the tire is marked in a manner indicating the direction of rotation in which the lateral structural force is greater. In this way the tire may be mounted on a vehicle so that the conventionally forward direction of rotation of the tire is in the direction of greater lateral structural force so that the effect of the forces acting on the tire which tend to alter its direction of travel are minimized.

An alternative method to accomplish the same result is to determine the direction of rotation of the tire in which the angular difference between the slip angle of the tire due to the lateral structural force acting on the tire and the slip angle of the tire due to the self-aligning torque acting on the tire is smaller and to mark the tire in such a manner that the tire may be mounted on a vehicle so that the conventionally forward direction of rotation of the tire is in the direction of smaller angular difference whereby the effect of the forces acting on the tire which tend to alter its direction of travel are minimized.

4 Claims, 3 Drawing Figures

METHOD FOR DETERMINING THE PREFERRED DIRECTION OF ROTATION OF A TIRE

This abstract is not to be taken either as a complete exposition or as a limitation of the present invention, however, the full nature and extent of the invention being discernible only by reference to and from the entire disclosure.

BACKGROUND OF THE INVENTION

This invention relates to a method for determining the preferred direction of rotation of a vehicle tire and more particularly to such a method whereby the tire may be mounted on a vehicle so that when the tire is rotating in the forward direction of the vehicle the forces acting on the tire, which tend to cause the vehicle to "pull" to one side, may be minimized.

It has long been noted that if an automobile is being driven in a straight path and the steering wheel is released, the vehicle will usually tend to pull or drift toward one side or the other of the straight path. It has been more recently noted that the problem is exacerbated by the utilization of modern, belted, radial ply tires, by which is meant radial ply carcass tires which are constructed with a breaker or belt interposed between the crown region of the tire carcass and the tire tread, the breaker being usually comprised of two layers or plies of tire cords or cables which are generally inextensible, similar but opposed low bias orientations of the cords or cables being employed in successive plies.

This problem of tire pull, which is hazardous due to the fatigue induced in the driver of the vehicle by the necessity of constantly utilizing force to maintain a straight path of vehicle travel and due to the fact that even a momentary release of the steering wheel may result in a loss of vehicle control, is caused by forces which the tire absorbs from the road surface over which the tire is traveling. The two forces here of primary interest, commonly referred to in the art as lateral structural force and self-aligning torque, each cause the tire, when in service on a vehicle and thus under load, to follow a path which is angularly offset from the median equatorial plane of the tire. The lateral structural force acting on the tire causes an angular offset or "slip angle" $\alpha s$ while the self-aligning torque acting on the tire causes an angular offset or slip angle $\alpha m$, and it is the fact that these two slip angles, $\alpha s$ and $\alpha m$, are generally unequal which causes the aforementioned problem of pull or drift.

SUMMARY OF THE INVENTION

It is, therefore, an important object of the present invention to provide a method for orienting tires on a vehicle by means of which the aforesaid drawbacks and disadvantages may be most efficaciously avoided.

It is a further object of this invention to provide a method for determining the preferred direction of rotation of a vehicle tire whereby the tendency of the tire to pull toward one side of a straight path is minimized.

The objectives of the present invention may be realized by a method for determining the preferred direction of rotation of a vehicle tire comprising the steps of determining the direction of rotation of the tire in which the lateral structural force acting on the tire is greater, and marking the tire in a manner indicating the direction of rotation in which said lateral structural force is greater, whereby the tire may be mounted on a vehicle so that the conventionally forward direction of rotation of the tire is the direction of greater lateral structural force, whereby the effect of the forces acting on the tire which tend to alter its direction of travel are minimized.

The objectives of the present invention may also be realized by a method for determining the preferred direction of rotation of a vehicle tire comprising the steps of determining the direction of rotation of the tire in which the angular difference between the slip angle of the tire due to the lateral structural force acting on the tire and the slip angle of the tire due to the self-aligning torque acting on the tire is smaller, and marking the tire in a manner indicating the direction of rotation in which said angular difference is smaller, whereby the tire may be mounted on a vehicle so that the conventionally forward direction of rotation of the tire is the direction of smaller angular difference whereby the effect of the forces acting on the tire which tend to alter its direction of travel are minimized.

BRIEF DESCRIPTION OF THE DRAWINGS

The foregoing and other objects and features of the invention will be more clearly understood from the following detailed description thereof when read in conjunction with the following drawings, in which.

DESCRIPTION OF THE PREFERRED EMBODIMENTS

Figure 1:
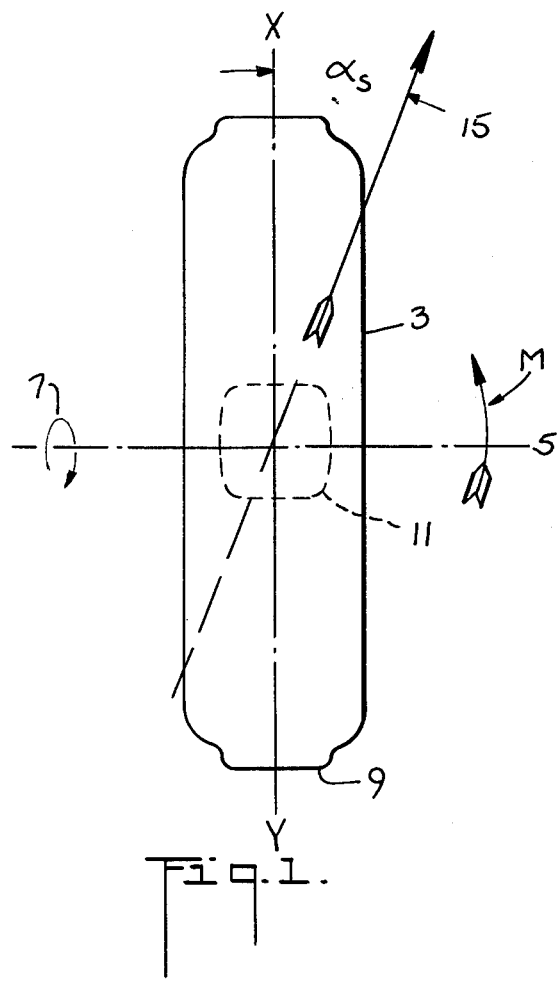
FIGS. 1 and 2 are top schematic views of a tire under load illustrating direction of tire travel and various forces acting thereon.

Turning now to FIG. 1, there is illustrated a top view of a tire 3 which rotates around the axis 5 in the direction indicated by arrow. 7. The tire 3 includes a tread 9 beneath which there is maintained a conventional belt including two superpositioned plies of generally inextensible belt cords and the tire is constructed to be symmetrical relative to its meidan equatorial plane, indicated at X-Y. The tire 3, when mounted on a vehicle and in service is subject to forces which deform the tread 9 and form a footprint indicated at 11.

The tire 3 illustrated in FIG. 1 is capable of free rotation in the direction indicated by arrow 7, and in the opposite direction, and it is also capable of free lateral displacement. It is, however, prevented from turning about its vertical turn axis (which extends perpendicularly through the footprint 11), by locking the steering linkage of the vehicle on which tire 3 is mounted. The tire 3 is now rotated in the direction indicated by the arrow 7 and the tire moves laterally until the effective lateral structural force S on the tire 3 is zero. In this condition the tire 3 is acted upon by a self-aligning torque, indicated by M, which may be measured by conventional means known in the art, which torque attempts to rotate the tire 3 about its vertical turn axis. The self-aligning torque is here absorbed, however, by the aforementioned locked steering linkage. At this time the direction of travel of the tire 3 is indicated by the arrow 15, and the oblique angle between the median equatorial plane of the tire, X-Y, and the direction of travel of the tire 3, which is the slip angle of the tire 3 caused by lateral structural force when the tire is rotating in the direction of arrow 7, is indicated as $\alpha s$, and this angle may be measured by conventional means known in the art.

Figure 2:
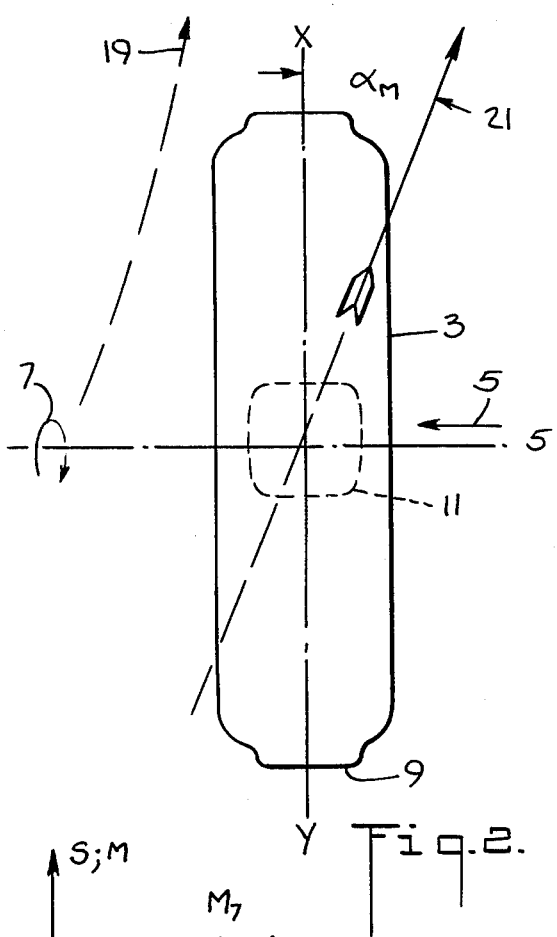

Turning now to FIG. 2, where the same numerals and letters are utilized to indicate corresponding directions and components, there is illustrated a tire 3 operating in the same manner and under similar conditions as the tire 3 illustrated in FIG. 1, with the exception that the steering linkage of the vehicle utilized in FIG. 2 has been unlocked and the tire 3 is therefore free to turn about its vertical turn axis. The tire 3 is now rotated in the direction indicated by the arrow 7 and the tire rotates about its vertical turn axis until the effective self-aligning torque M acting on the tire 3 is zero. In this condition the tire 3 is acted upon by a lateral structural force, indicated at S, which is measured, which attempts to move the tire 3 laterally so that it will travel the curved path indicated by the arrow 19. Although, as just stated, the tire 3 tends to follow the curved or arched path indicated by the arrow 19, the instantaneous direction of travel of the tire 3 is indicated by the straight arrow 21. The oblique angle formed between the median equatorial plane of the tire, X-Y, and the instantaneous direction of the travel of the tire, indicated by arrow 21, which is the slip angle of the tire 3 caused by self-aligning torque when the tire is rotating in the direction of arrow 7, is indicated, in FIG. 2, as $\alpha\ m$ and this angle is measured.

The foregoing illustrates the preferred methods for determining $\alpha\ s$, the slip angle of a tire due to lateral structural force and $\alpha\ m$, the slip angle of a tire due to self-aligning torque as well as the methods for determining S, the lateral structural force and M, the self-aligning torque which induce the slip angles. Although the methods have been discussed for only one direction of rotation, clearly the methods described are applicable to either direction of rotation. Measurement of the forces acting upon, and the slip angles of, a tire in both directions of rotation have resulted in the discovery that, not only do the slip angles $\alpha\ s$ and $\alpha\ m$ vary in dependence on the direction of tire rotation, but that the angular difference between the slip angles also varies in dependence on the direction of tire rotation. It has further been found that the lateral structural force S is always greater in the direction of rotation in which the angular difference between $\alpha\ s$ and $\alpha\ m$ is smaller.

Figure 3:
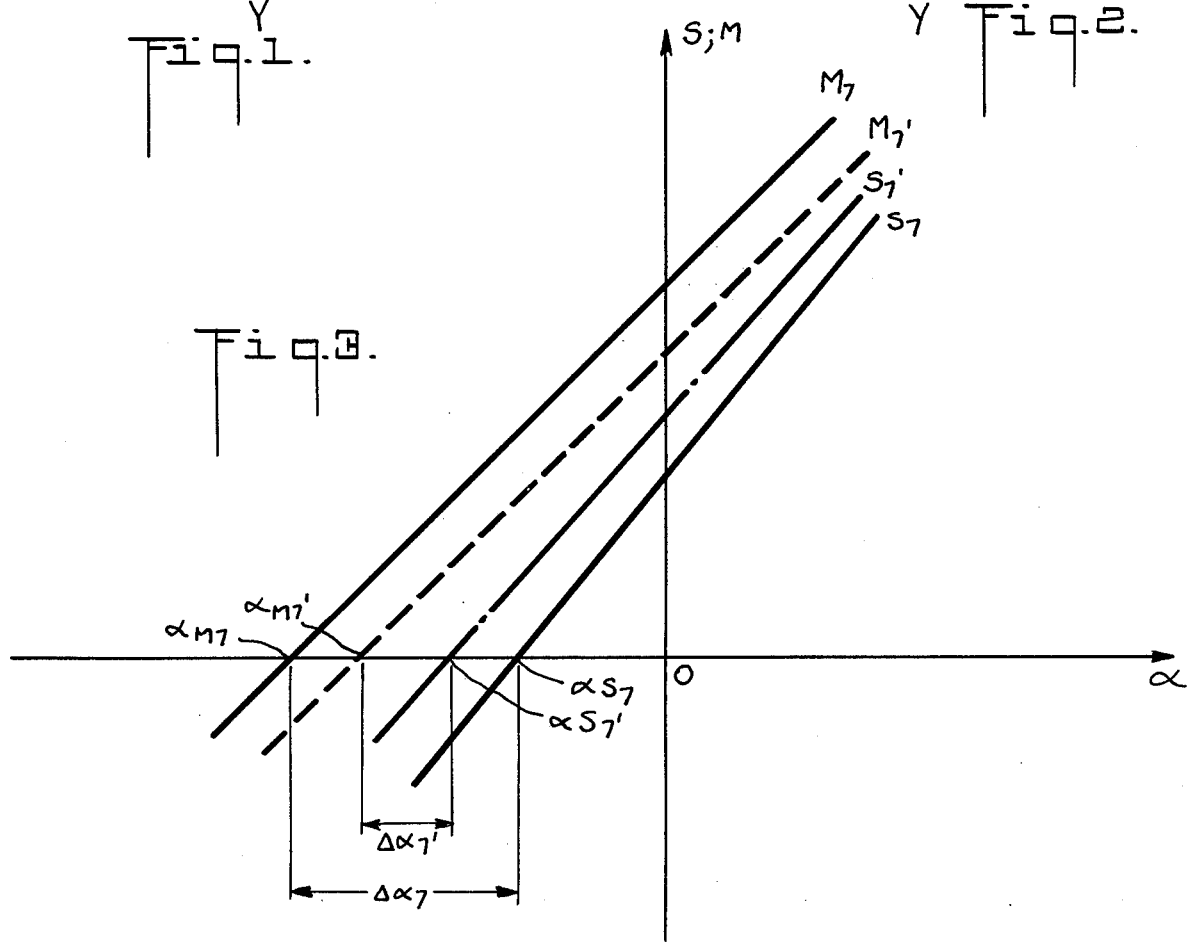
FIG. 3 is a graphical representation of the forces acting on the tire versus the slip angle of the tire.

Turning now to FIG. 3, there is illustrated a graphical representation of the lateral structural force S and the self-aligning torque M plotted against the tire slip angle $\alpha$. In this representation the subscript 7 refers to one direction of tire rotation and the subscript 7' refers to the opposite direction of rotation. It may be seen in FIG. 3 that the angular difference between the slip angle $\alpha\ m$ measured in accordance with the method described in FIG. 2 and the slip angle $\alpha\ s$ measured in accordance with the method described in FIG. 1, in the direction of rotation opposite to that illustrated in FIGS. 1 and 2 and indicated in FIG. 3 as $\Delta\ \alpha\ 7'$, is smaller than the corresponding angular difference measured in the opposite direction of rotation and indicated in FIG. 3 as $\Delta\ \alpha\ 7$. It may also be seen from FIG. 3 that the lateral structural force S, in the direction of rotation opposite so that indicated in FIGS. 1 and 2, and indicated in FIG. 3 as S7', is greater than the corresponding lateral structural force measured in the opposite direction of rotation and indicated in FIG. 3 as S7.

It may now be seen that since, as previously noted, it is desirable to mount a tire on a vehicle so that in the usually forward direction of rotation of the tire the angular difference between the slip angles $\alpha\ s$ and $\alpha\ m$ is smaller, the required determination may be accomplished in two ways. That is, the slip angles $\alpha\ s$ and $\alpha\ m$ may be measured for both directions of rotation and the angular differences calculated or the lateral structural force acting on the tire may be measured for both directions of rotation, since, as discussed with respect to FIG. 3, the direction of tire rotation in which the lateral structural force is greater is also the direction of rotation in which the aforementioned angular difference is smaller.

The preferred direction of rotation may be indicated on the tire in any manner desired. For example, an arrow or a dot may be marked on the tire with, for example, paint or crayon, or one side of the tire may be magnetically marked on the rubber of the tire may be molded with a suitable indicator.

It will be understood that the foregoing description of the preferred embodiments of the present invention is for purposes of illustration only, and that the various features as herein disclosed are susceptible to a number of modifications and changes none of which entail any departure from the sprit and scope of the present invention as defined in the hereto appended claims.

What is claimed is:

1. A method for determining the preferred direction of rotation of a vehicle tire comprising the steps of:

determining the direction of rotation of the tire in which the angular difference between the slip angle of the tire due to the lateral structural force acting on the tire and the slip angle of the tire due to the self-aligning torque acting on the tire is smaller; and marking the tire in a manner indicating the direction of rotation in which said angular difference is smaller, whereby the tire may be mounted on a vehicle so that the conventionally forward direction of rotation of the tire is in the direction of smaller angular difference whereby the effect of the forces acting on the tire which tend to alter its direction of travel are minimized.

2. A method according to claim 1 further comprising the steps of:

rotating the tire in a first direction;

measuring the first slip angle of the tire while it is rotating in said first direction when the self-aligning torque acting on the tire is zero;

measuring the second slip angle of the tire while it is rotating in said first direction when the lateral structural force acting on the tire is zero;

rotating the tire in a second direction;

measuring the third slip angle of the tire while it is rotating in said second direction when the self-aligning torque acting on the tire is zero; and measuring the fourth slip angle of the tire while it is rotating in said second direction when the lateral structural force acting on the tire is zero.

3. A method according to claim 2 further comprising the steps of:

determining the angular difference between said first and second slip angles; and determining the angular difference between said third and fourth slip angles.

4. A method according to claim 2 further comprising the step of preventing the turning of the tire about its vertical axis to eliminate the lateral structural force acting on the tire thereby enabling the measurement of said second and fourth slip angles.

* * * * *